United States Patent
Despres-Nadeau

(10) Patent No.: US 8,714,293 B2
(45) Date of Patent: May 6, 2014

(54) CONSTANT VELOCITY JOINT WITH COOLING RING

(71) Applicant: Bombardier Recreational Products Inc., Valcourt (CA)

(72) Inventor: Charles Despres-Nadeau, Sherbrooke (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 13/824,610

(22) PCT Filed: Sep. 28, 2012

(86) PCT No.: PCT/US2012/057868
§ 371 (c)(1),
(2), (4) Date: Mar. 18, 2013

(87) PCT Pub. No.: WO2014/051614
PCT Pub. Date: Apr. 3, 2014

(65) Prior Publication Data
US 2014/0090917 A1    Apr. 3, 2014

(51) Int. Cl.
*B60K 17/34*    (2006.01)
(52) U.S. Cl.
USPC .......................................... 180/233; 464/139
(58) Field of Classification Search
USPC .................................. 180/233; 464/139–142
See application file for complete search history.

(56) References Cited

U.S. PATENT DOCUMENTS

| | | | |
|---|---|---|---|
| 2,410,340 A | 10/1946 | Cronstedt | |
| 2,449,944 A * | 9/1948 | Johnson | 29/898.063 |
| 3,105,369 A | 10/1963 | Mazziotti et al. | |
| 6,209,673 B1 * | 4/2001 | Barlage et al. | 180/248 |
| 6,616,538 B2 | 9/2003 | Perrow | |
| 6,712,172 B2 | 3/2004 | Inagaki et al. | |
| 7,008,327 B2 | 3/2006 | Kuczera et al. | |
| 7,419,434 B2 | 9/2008 | Wormsbaecher | |
| 2011/0162765 A1 * | 7/2011 | Murakami et al. | 148/653 |
| 2012/0055587 A1 * | 3/2012 | Vissers et al. | 148/516 |

OTHER PUBLICATIONS

International Search Report of PCT/US2012/057868, Dec. 27, 2012.

* cited by examiner

*Primary Examiner* — Tashiana Adams
(74) *Attorney, Agent, or Firm* — BCF LLP

(57) ABSTRACT

A constant velocity joint includes an outer housing and an inner race disposed inside the outer housing and spaced therefrom. The outer housing and inner race are respectively rotatable about a first and second rotation axes, and moveable relative to one another to change an angle between the rotation axes. A cage, disposed between the outer housing and the inner race, has cage windows defined therethrough. A plurality of balls, each retained in a corresponding cage window roll along corresponding outer housing grooves and inner race grooves, respectively defined on an inner surface of the outer housing and an outer surface of the inner race. Rotation of one of the outer housing and the inner race about their respective rotation axis, causes rotation of the other. A cooling member disposed on the outer housing contacts at least a portion of its outer surface. Powertrains and vehicles are also disclosed.

24 Claims, 7 Drawing Sheets

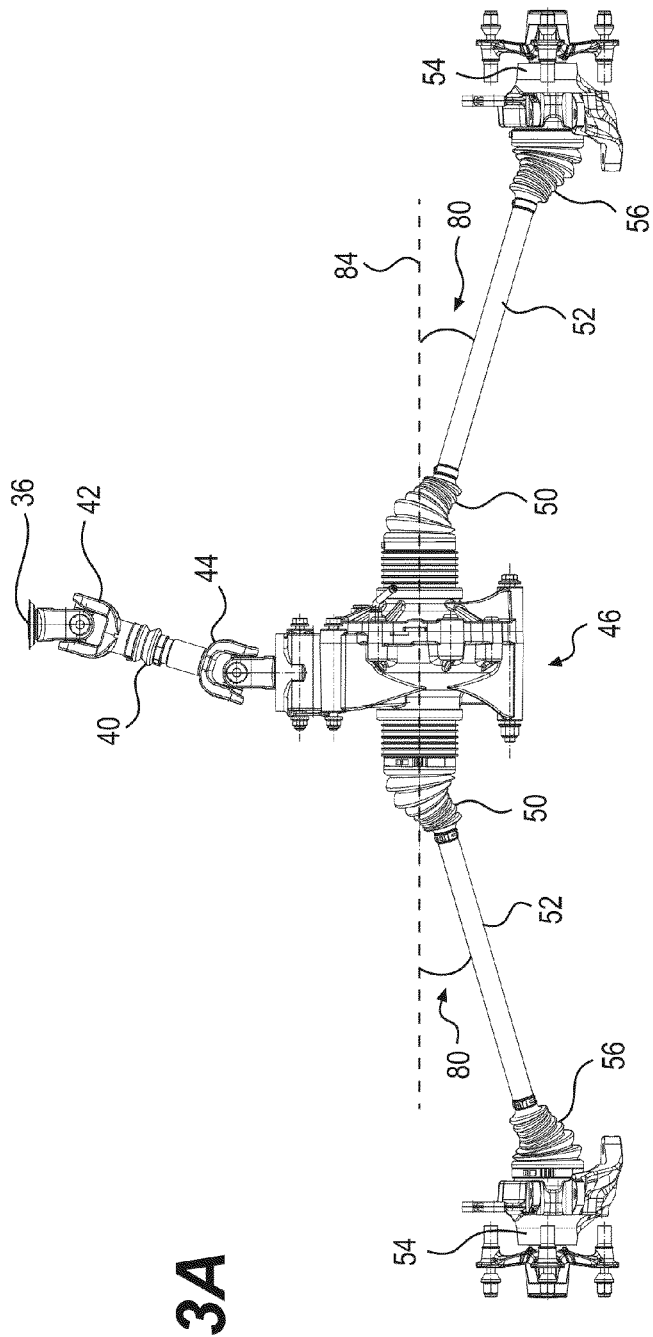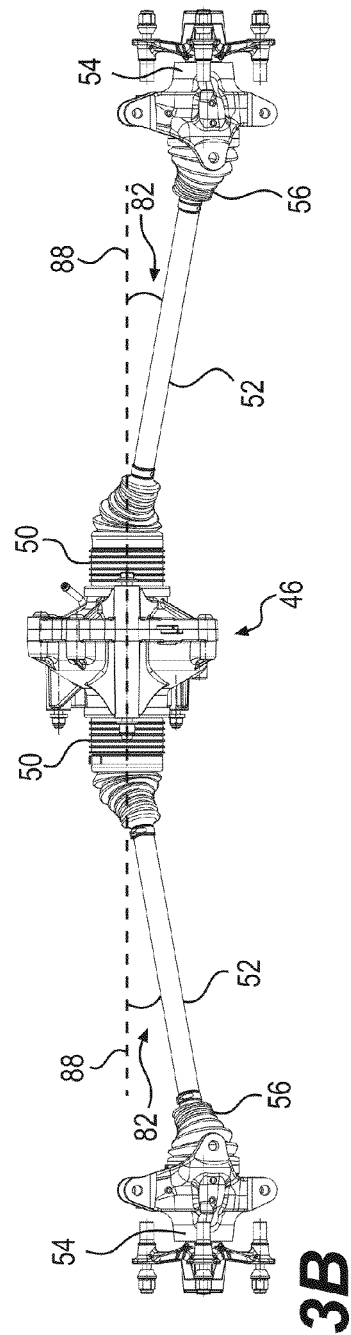
FIG. 3A
FIG. 3B

CONSTANT VELOCITY JOINT WITH COOLING RING

FIELD OF THE INVENTION

The present invention relates generally to constant velocity joints.

BACKGROUND

Constant velocity joints (CVJs), also known as homokinetic joints, are used in joints between two rotating shafts to transmit rotation from one shaft to another at a constant velocity even if the angle between the shafts varies. This type of joint is commonly used in automobiles to enable transmission of torque from the engine to the wheels. Some constant velocity joints also allow for sliding contact between the shafts, for example, to allow the distance between the differential and the wheel (where this type of joint is widely used) to shorten and lengthen with the strokes of the suspension.

Some CVJs are ball and groove type joints having a cup-shaped outer housing, an inner race, a cage and a plurality of balls. The outer housing and the inner race are machined with grooves. The cage, placed between them, is machined with windows. The balls are placed in the windows so as to be able to move in the grooves of the outer housing and the inner race. This allows the outer housing and the inner race to move relative to each other, and thereby change the angle between their respective rotation axes while continuing to transmit torque from one to the other. The ball bearings held between the outer housing and the inner race rotate in the respective grooves so that a constant rotational speed can be maintained between the outer housing and the inner race even when their rotation axes are not aligned. Examples of such ball and groove type CVJs include fixed ball-type joints, also known as Rzeppa joints, and plunging ball-type joints. Fixed ball-type joints only permit rotation of the outer housing and inner race with respect to each other while plunging ball-type joints also allow axial motion between the outer housing and inner race.

In all of these ball and groove type CVJs, friction between the ball bearings and the groove surfaces generates heat in the joint which must be dissipated. The amount of heat generated depends on the rotational speed of the shafts, the torque exerted on the joint, and the operating angle of the joint. Heat generated at low operating angles can be dissipated through the outer housing to maintain reasonable operating temperatures in the joint. At large operating angles, however, the amount of heat generated can be too much to be dissipated effectively via the housing. The resulting high temperatures can damage the lubrication as well as the rubber boot protecting the CVJ from dust and dirt. Excessive heat can also negatively affect the metallic parts in the CVJ.

To aid heat dissipation, the external surface of the outer housing is sometimes provided with fins or grooves. Since all the torque in the driveline is transmitted through the outer housing, the outer housing must be sufficiently resistant to withstand these torques. The outer housing is thus typically made of steel, and its walls are made thicker in order to create the fins and grooves. While the fins and grooves can aid in dissipating some of the excess heat, they also significantly increase the weight of the CVJ.

There is thus a need for a CVJ that can operate at large operating angles, with high torques, and at high rotational speeds while effectively dissipating heat generated under these operating conditions.

SUMMARY

It is an object of the present invention to ameliorate at least some of the inconveniences present in the prior art.

In a first aspect, the present provides a constant velocity joint (CVJ) for transmitting rotation between a first shaft and a second shaft. The outer housing is rotatable about a first rotation axis and adapted to be connected to the first shaft. The first rotation axis is coaxial with the first shaft. The outer housing has an inner surface and an outer surface. An inner race is rotatable about a second rotation axis. The inner race is disposed inside the outer housing and spaced therefrom. The inner race is adapted to be connected to the second shaft. The second rotation axis is coaxial with the second shaft. The outer housing and inner race are movable relative to one another to change an angle between the first axis and the second axis of rotation. A cage is disposed between the outer housing and the inner race. A plurality of balls are held between the outer housing and the inner race so that rotation of one of the outer housing, about the first rotation axis, and the inner race, about the second rotation axis, causes rotation of the other of the outer housing, about the first rotation axis, and the inner race about the second rotation axis. Each of the plurality of balls is retained in a corresponding cage window defined through the cage so as to roll along a corresponding one of a plurality of outer housing grooves and a corresponding one of a plurality of inner housing grooves. Each outer housing groove is defined on the inner surface of the outer housing. Each inner race groove is defined on an outer surface of the inner race. A cooling member is fitted onto the outer housing. At least a portion of the outer surface of the outer housing is in contact with the cooling member.

In an additional aspect, the outer housing and inner race are moveable relative to one another along a direction parallel to the first rotation axis.

In another aspect, the outer housing has a portion extending outside the cooling member.

In yet another aspect, the outer housing is in contact with the cooling member on the outer surface in a region where the corresponding inner surface has the plurality of outer housing grooves defined thereon.

In a further aspect, the cooling member is symmetric about the first rotation axis.

In an additional aspect, at least a portion of the outer surface of the outer housing is cylindrical and the cooling member is a cooling sleeve enclosing the portion of the outer housing.

In another aspect, the cooling member comprises fins extending outward away from the outer surface of the outer housing.

In another aspect, the fins extend in a direction transverse to the first rotation axis.

In yet another aspect, the fins extend in a direction parallel to the first rotation axis.

In a further aspect, a flexible boot has a first end portion removably attached to at least one of the outer housing and the cooling member, and a second end portion, opposite to the first end portion, being adapted to be removably attached to the second shaft.

In a further aspect, the first end portion of the flexible boot is removably attached to the outer housing at a portion of the outer surface extending outside the cooling member.

In a further aspect, the cooling member comprises a dust lip at an end of the cooling member. The dust lip is spaced from the outer surface of the outer housing to receive a flange therebetween.

In an additional aspect, the cooling member is made of aluminum.

In another aspect, at least a portion of the outer surface of the outer housing is cylindrical and the cooling member comprises at least one cooling ring enclosing the cylindrical portion of the outer housing.

In another aspect, the cooling member comprises at least one of at least one fin extending outward away from the outer surface of the outer housing, and at least one groove exposing the outer surface of the outer housing.

In a second aspect, the present provides a powertrain having a motor, and a driveshaft connected to the motor and rotatable thereby. A gear assembly is connected to the driveshaft. The gear assembly has at least one output gear. The powertrain includes a left drive axle and a right drive axle. Each drive axle is adapted to be connected to a wheel. The powertrain also includes left constant velocity joint and a right constant velocity joint having at least one of the aspects described above. For each of the left and right constant velocity joints, the first shaft is connected to the outer housing, and the second shaft is connected to the inner race. The first shaft is connected to the corresponding the at least one output gear, and the second shaft is connected to the corresponding one of the left and right drive axles.

In yet another aspect, each of the left constant velocity joint and a right constant velocity joint has a portion of the outer surface of the outer housing extending outside the cooling member and extending into the gear assembly.

In an additional aspect, the gear assembly has a left flange and a right flange. The left flange extends towards the left constant velocity joint, and the right flange extends towards the right constant velocity joint. In some embodiments, the corresponding one of the left and right flanges further extends over a portion of the outer surface of the outer housing extending outside the cooling member. In some embodiments, the cooling member comprises a dust lip at an end thereof, and the corresponding one of the left and right flanges is received between the outer surface of the outer housing and the dust lip.

In an additional aspect, the first shaft is integrally connected to the outer housing.

In a further aspect, the second shaft is integrally connected to the corresponding one of the left and right drive axles.

In a third aspect, the present provides a vehicle having a frame. A cockpit area is defined in the frame. At least one seat is disposed in the cockpit area. A motor is connected to the frame. A pair of front wheels, including a left front wheel and a right front wheel, is connected to the frame. A pair of rear wheels, including a left rear wheel and a right rear wheel, is connected to the frame. At least one of the pair of front wheels and the pair of rear wheels is operatively connected to the engine for propelling the vehicle. A steering member is operatively connected to at least one of the pair of front wheels and the pair of rear wheels. A driveshaft is connected to the motor, the driveshaft being rotatable thereby. A gear assembly is connected to the driveshaft. The gear assembly has at least one output gear. The vehicle also includes a left drive axle and a right drive axle. The left drive axle is connected to the left one of one of the pair of front wheels and the pair of rear wheels. The right drive axle is connected to the right one of the one of the pair of front wheels and the pair of rear wheels. Also included are a left constant velocity joint and a right constant velocity joint having at least one of the above described aspects. For each of the left and right constant velocity joints, the first shaft is connected to the outer housing, the second shaft is connected to the inner race, the first shaft is connected to the at least one output gear, and the second shaft is connected to the corresponding one of the left and right drive axles.

In another aspect, when the vehicle is stationary on level ground, a position of the center of the right left rear wheel and a position of the center of the left right rear wheel are each one of: longitudinally rearward of, and longitudinally aligned with, the respective one of the left and right constant velocity joints.

In another aspect, when the vehicle is stationary on level ground, a position of the center of the right left rear wheel and a position of the center of the left right rear wheel are each one of: vertically lower than, and vertically aligned with, the respective one of the left and right constant velocity joints.

For purposes of the present application, terms related to spatial orientation when referring to a vehicle and components in relation to the vehicle, such as "forwardly", "rearwardly", "left", "right", "above" and "below", are as they would be understood by a driver of the vehicle, with the vehicle in a straight ahead orientation (i.e. not steered left or right), and in an upright position (i.e. not tilted).

Embodiments of the present invention each have at least one of the above-mentioned object and/or aspects, but do not necessarily have all of them. It should be understood that some aspects of the present invention that have resulted from attempting to attain the above-mentioned object may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 3A is a close-up top plan view of the rear portion of the powertrain of FIG. 2;

FIG. 3B is a rear elevation view of the rear portion of the powertrain of FIG. 2;

DETAILED DESCRIPTION

Embodiments of the present invention will be described with respect to a recreational utility vehicle (RUV). However, it contemplated that aspects of the embodiments of the present invention could also be used on other types of wheeled vehicles, such as all-terrain vehicles (ATVs), or other types of machines using a CVJ.

Figure 1:
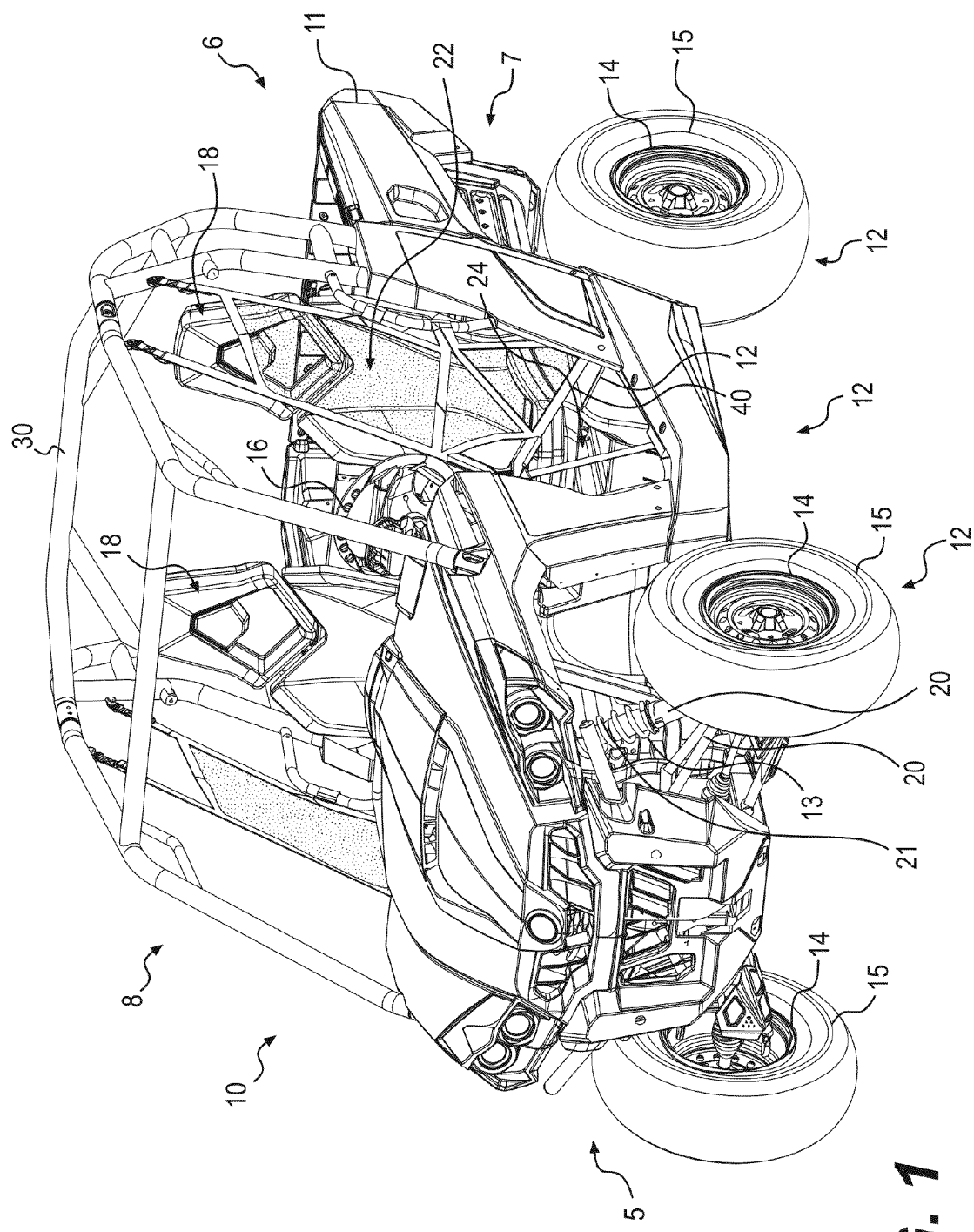
FIG. 1 is a perspective view, taken from a front, left side, of a recreational utility vehicle (RUV)

FIG. 1 illustrates an RUV 10 having a front end 5 a rear end 6, a left lateral side 7 and a right lateral side 8. The RUV 10 includes a frame 12 to which a vehicle body is mounted. A pair of front wheels 14 is suspended from the front portion of the frame 12 via front suspensions 13. A pair of rear wheels 14 is suspended from the rear portion of the frame 12 via rear suspensions (not shown). Each of the four wheels 14 has a tire 15. It is also contemplated that the RUV 10 could have six or more wheels.

A cockpit area 22 is disposed in the middle portion of the frame 12. The cockpit area 22 comprises two seats 18 (left and right), mounted laterally beside each other to accommodate a driver and a passenger (riders) of the RUV 10. The cockpit area 22 is open at the two lateral sides 7, 8 of the RUV 10, forming two lateral passages 24 (left and right) through which the riders can ingress and egress the RUV 10. A lateral cover 40, selectively disposed across each lateral passage 24, can be opened to clear the lateral passage 24 for egress or ingress. A cargo box 11 is pivotally mounted to the frame 12 rearwardly of the seats 18.

A roll cage 30 is connected to the frame 12 and disposed above the cockpit area 22. The roll cage 30 is an arrangement of metal tubes which aids in protecting the riders in the event the vehicle rolls over.

A motor 29 (shown schematically in FIG. 2) is mounted to the middle portion of frame 12 between the right and the left seats 18. In the illustrated embodiment of the RUV 10, the motor 29 is an internal combustion engine. It is, however, also contemplated that the motor 29 could be an electric motor. The term "motor" as used herein, represents any kind of internal combustion engine, electric motor, hybrid or other system used to propel the RUV 10. A console (not shown), positioned between the right and left seats 18 covers and separates the motor 29 from the driver and the passenger.

A steering assembly 16 including a steering wheel is disposed in front of the left seat 18. It is contemplated that, the steering wheel could be disposed in front of the right seat 18. The steering assembly 16 is operatively connected to the two front wheels 14 to permit steering of the RUV 10.

Each front suspension 13 includes lower and upper A-arms 20 pivotally connected at one end to the frame 12, and at the other end to the corresponding front wheel 14. A shock absorber 21 is connected between the outer end of each upper A-arm 54 and the frame 12. A sway bar (not shown), disposed rearwardly of the front suspensions 13, is connected to both upper A-arms 54 to increase the roll stiffness of the front suspensions 13.

Each rear suspension includes a swing arm connected to the lower end of a shock absorber. The upper end of each shock absorber connects to the frame 12. A torsion bar (not shown) is operatively connected between the swing arms of the left and right rear suspensions to increase the roll stiffness of the suspensions.

The RUV 10 has other features and components such as headlights and handles. As it is believed that these features and components would be readily recognized by one of ordinary skill in the art, further explanation and description of these components will not be provided herein.

Figure 2:
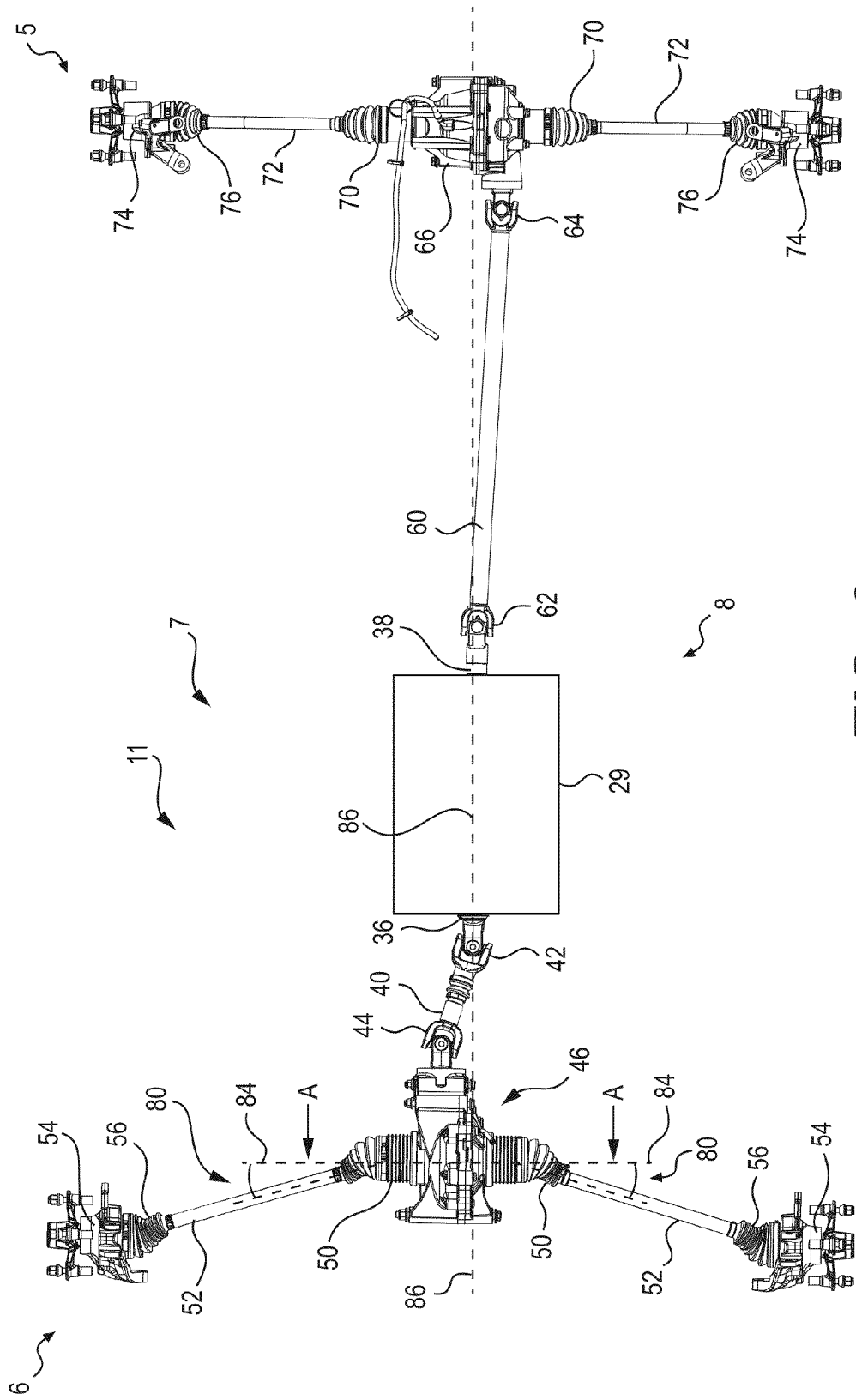
FIG. 2 is a top plan view of a powertrain of the RUV of FIG. 1.
Figure 3C:
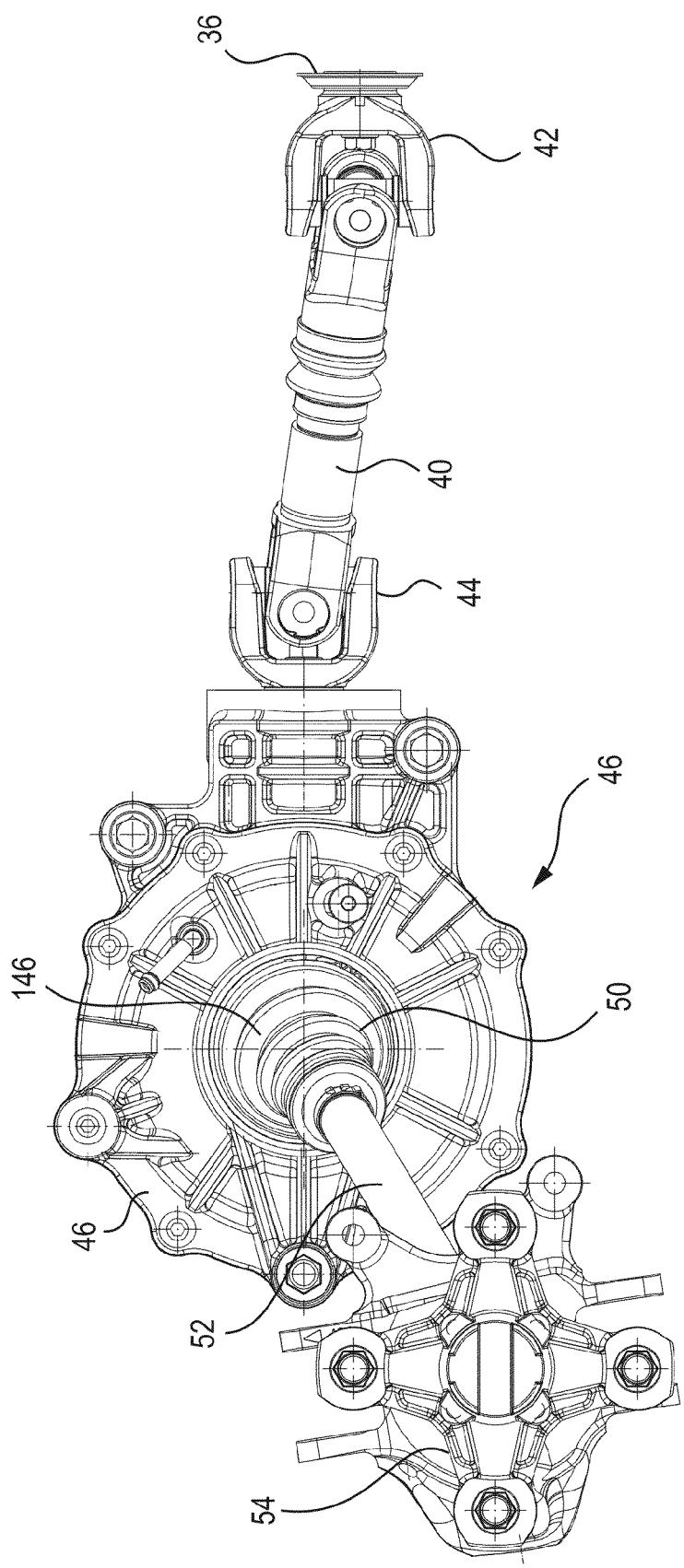
FIG. 3C is a right side elevation view of the rear portion of the powertrain of FIG. 2.

With reference to FIG. 2, the powertrain 11 of the RUV 10 will now be described.

The motor 29 is located laterally on the frame 12 such that a vertical plane containing a longitudinal centerline 86 of the RUV 10 passes through the motor 29. The motor 29 is operatively connected to the four wheels 14 to power the RUV 10 and selectively switches between driving two and four wheels 14. A 2WD/4WD selector (not shown) is provided to switch the motor 29 between the two wheel and four wheel drive configurations. It is contemplated that the motor 29 could be operatively connected only to the front wheels 14 or only to the rear wheels 14.

A rear driveshaft 40 connects to and is driven by the rear shaft 36 of the motor 29 via a universal joint 42. As such, in this embodiment, the rear driveshaft 40 is always driven by the motor 29 when the motor 29 is operating. From the universal joint 42, the rear driveshaft 40 extends rearwardly and toward the left of the vehicle 10 to another universal joint 44. The universal joint 44 connects the rear driveshaft 40 to a rear gear assembly 46. The rear gear assembly 46 connects, via constant velocity joints 50 to left and right rear drive axles 52. The rear drive axles 52 are connected to spindles 54 of the rear wheels 14 via constant velocity joints 56.

A front driveshaft 60 is selectively connected to the front shaft 38 of the motor 29 via a universal joint 62. The front shaft 38 is selectively connected to the motor 29 by actuating a 2WD/4WD selector (not shown). When the 2WD/4WD selector is in the 4WD position, the front shaft 38 is connected to the motor 29, and when the selector is in the 2WD position, the front shaft 38 is disconnected from the motor 29. As such, the front driveshaft 60 is only driven by the motor 29 when the motor 29 is operating and when the 2WD/4WD selector is in the 4WD position.

From the universal joint 62, the front driveshaft 60 extends forwardly and toward the right of the RUV 10 to another universal joint 64. The universal joint 64 connects the front driveshaft 62 to a front gear assembly 66. The front gear assembly 66 connects, via constant velocity joints 70, to left and right front drive axles 72. The front drive axles 72 are connected to spindles 74 of the front wheels 14 via constant velocity joints 76.

The universal joints 42, 44, 62, and 64 connected at the ends of the front and rear driveshafts, 60 and 40, are Cardan-type universal joints, but it is contemplated that these joints could be constant velocity joints (CVJs). The CVJs 56, 76 connecting the drive axles 52, 72 to their respective wheels are the fixed ball-type of CVJ which do not allow axial movement. The CVJs 50, 70 connecting the gear assemblies 46, 66 to their respective drive axles 52, 72 are plunging ball-type CVJs which allow motion in the axial direction. Plunging CVJs are typically used for high rotational speed applications while fixed CVJs are more suitable for higher operating angle operations. It is however contemplated that each of the joints 50, 70, 46, 66 could be either of the fixed type or the plunging type. The plunging ball-type CVJ 50 connecting the rear gear assembly 46 to the rear drive axles 52 will be discussed below in more detail. The rear drive axles 52 and the front drive axles 72 are not identical in the illustrated embodiment but it is contemplated that they could be identical.

With reference to FIGS. 3A, 3B, 3C and 4, the rear portion of the powertrain 11 of the RUV 10 will be discussed in more detail. The RUV 10 and its powertrain 11 shown in the figures are in their configuration as positioned stationarily on level ground.

Figure 4:
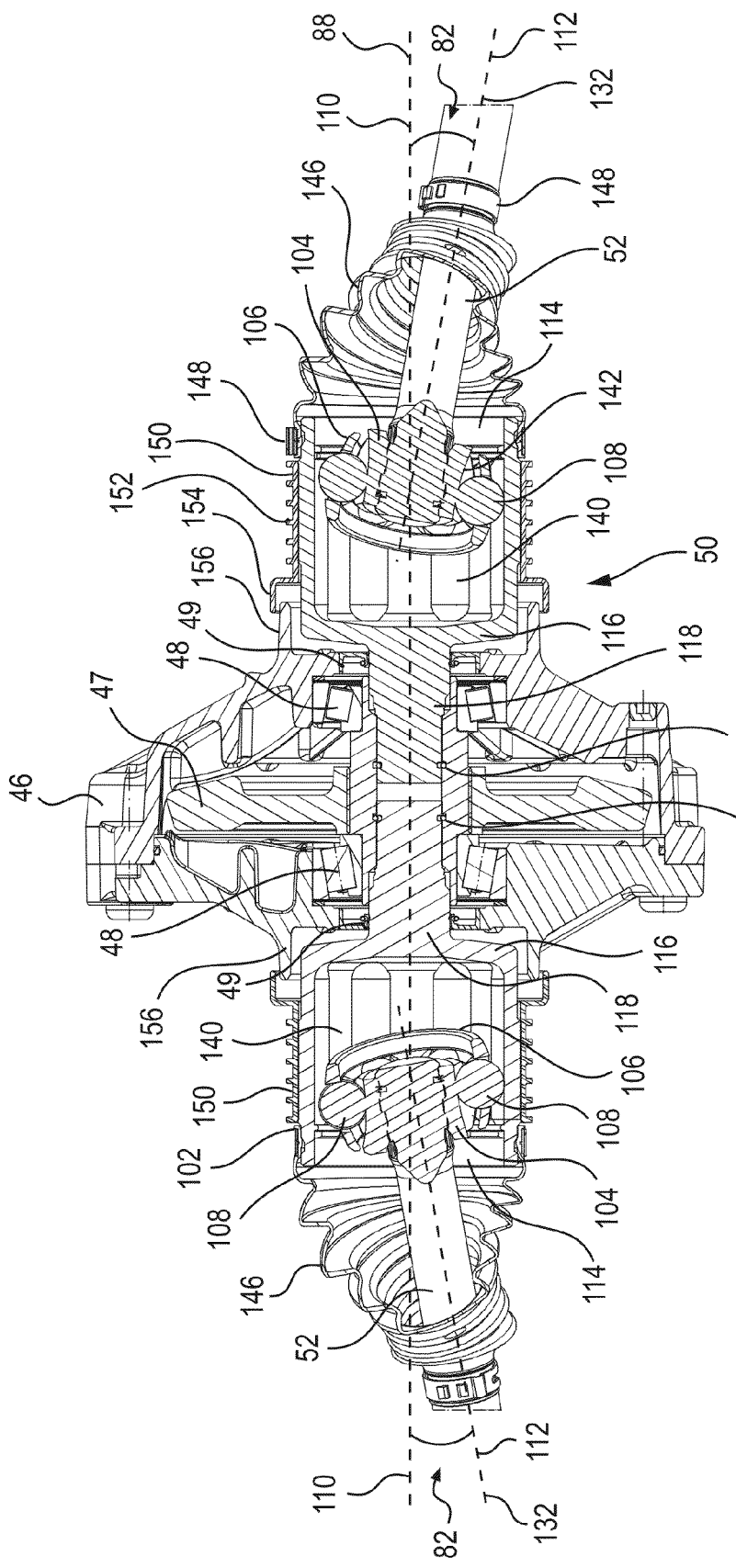
FIG. 4 is a cross-sectional view, taken along the line A-A of FIG. 2, of the rear gear assembly connected to a pair of drive axles by a pair of constant velocity joints.
Figure 5:
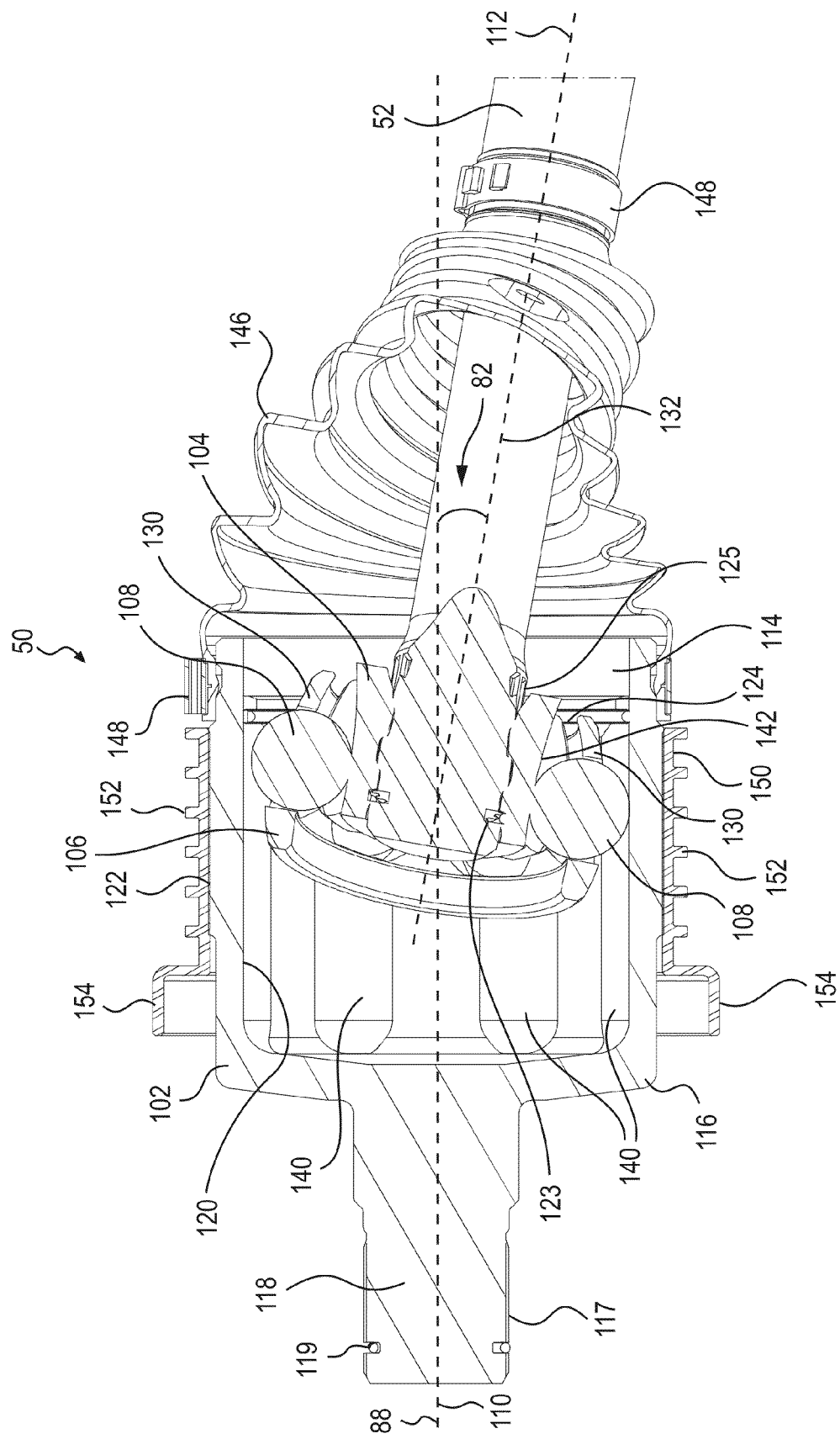
FIG. 5 is a close-up cross-sectional view of the left side constant velocity joint connected to the left rear drive axle of FIG. 4, with the gear assembly removed for clarity.
Figure 6C:
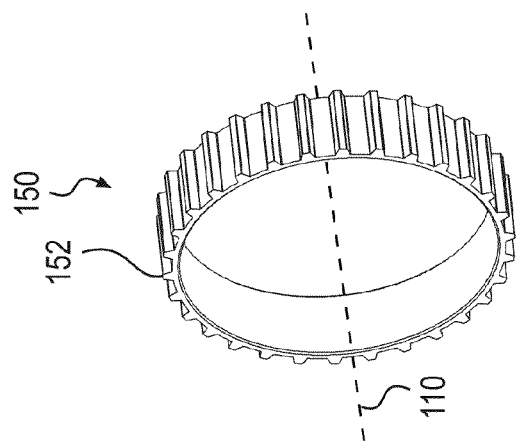
FIG. 6C is a perspective view, taken from a rear left side, of a cooling ring according to yet another embodiment.
Figure 6B:
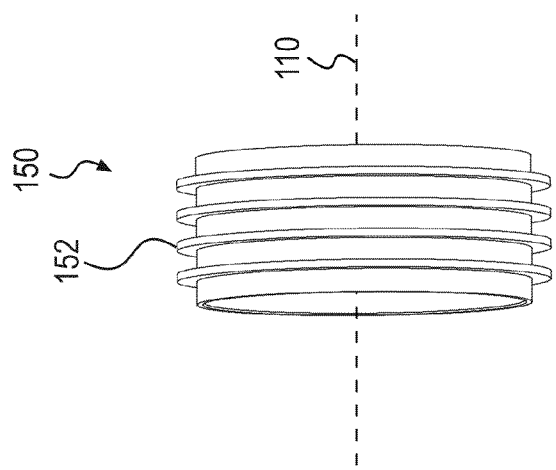
FIG. 6B is a perspective view, taken from a rear left side, of a cooling ring according to another embodiment.
Figure 6A:
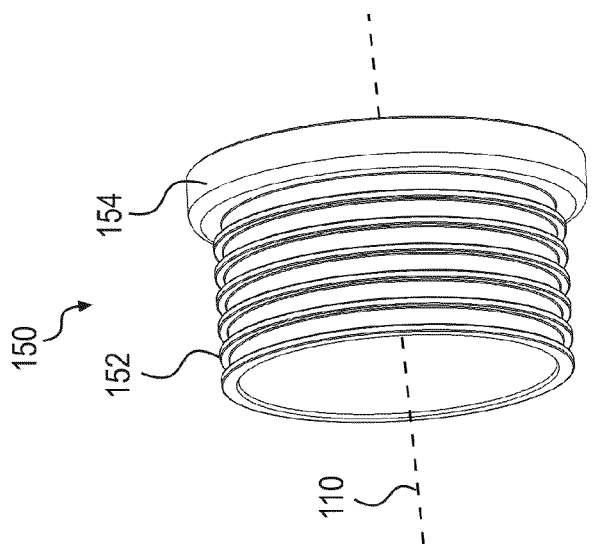
FIG. 6A is a perspective view, taken from a rear left side, of a cooling ring installed on the left side constant velocity joint of FIG. 5, shown in isolation.

The rear gear assembly 46 has a bevel gear arrangement to transmit the rotation of the universal joint 44 to each of the rear drive axles 52. An input bevel gear (not shown) is connected to the universal joint 44 while an output bevel gear 47 is connected to the CVJs 50 as best seen in FIG. 4. A housing 46 rotatably supports the output bevel gear 47 on roller bearings 48. It is also contemplated that the rear gear assembly 46 could be a differential, a limited-slip differential, or any other type of gear arrangement.

In this embodiment, the input and output bevel gears are selected such that a speed of rotation of the rear drive axle 52 is less than a speed of rotation of the universal joint 44. It is however contemplated that bevel gear arrangement 46 could be configured so that the rear drive axles 52 have the same or greater rotation speed of the universal joint 44.

With reference to FIG. 4, the left and right rear drive axles 52 are both driven by the same output bevel gear 47 and therefore, the left and right rear wheels 14, rotate together at the same speed in this embodiment. It is however contemplated that the rear gear assembly 46 could have a separate left and right output bevel gear, each connecting to the respective left or right CVJ 50 so that the rear drive axles 52 and the rear wheels 14 of each side could rotate independently of the other. It is also contemplated that the rotation of the left and right side wheels 14 could be selectively coupled together, for example, with a mechanism such as an axle lock selectively coupling the left and right rear drive axles 52 or a gear lock selectively coupling the left and right bevel gears. It is further contemplated that one of the left or right drive axles 52 is always connected to the output bevel gear 47 of the rear gear assembly 46 and selectively coupled to the other rear drive axle 52 so that one of the rear wheels 14 is always driven by the bevel gear 47 and the other rear wheel 14 is selectively driven by the bevel gear 47 when the rear drive axles 52 are connected together.

As can be seen in FIG. 3A, the rear wheels 14 are positioned such that the center of the rear wheels 14 is longitudinally rearward of the CVJ 50 connecting the rear gear assembly 46 and the rear drive axle 52. When viewed from above as shown in this figure, the drive axles 52 are at a non-zero angle 80 with a vertical plane 84 perpendicular to the longitudinal centerline 86 of the RUV 10 and passing through the CVJ 50. In the illustrated embodiment, the angle 80 is approximately 20° with the RUV 10 stationary and on level ground.

When viewed from behind, as best seen in FIG. 3B, the rear drive axles 52 are oriented at an angle 82 below a horizontal plane 88 passing through the CVJ 50. The angle 82 in the illustrated configuration (i.e. with the RUV 10 stationary and on level ground) is 10°.

As the RUV 10 travels over uneven terrain, the suspensions allow the front and rear wheels 14, and the connected drive axles 52, 72, to move up and down to compensate for changes in ground level. During suspension movement, the wheels 14 may experience some scrub, i.e. inward/outward movement of the wheel 14 with respect to the longitudinal centerline 86. In addition, the front wheels 14 can pivot about a vertical axis in response to steering. Wheel movement in the forward and rearward directions, however, is much more restricted compared to the upward/downward motion.

The suspensions thus change the orientation of the drive axles 52, 72 relative to the respective gear assemblies 46, 66. In the rear portion of the powertrain 11, for example, the angle 82 between the rear drive axle 52 can sweep upwards up to an angle 20° above the horizontal plane 88 and downwards to an angle 30° below the horizontal plane 88. The angle 80 between the rear drive axles 52 and the vertical plane 84 can also vary between 0° and 20°.

Although the angle between the rear drive axles 52 and the rear gear assembly 46 changes with the motion of the wheels 14 and the suspensions, the rotational speed of the rear drive axles 52 is maintained at the same speed as the output bevel gear 47 of the rear gear assembly 46. This constant rotational speed is maintained by the CVJs 50, discussed below in more detail, connecting the rear gear assembly 46 with the rear drive axles 52.

Turning now to FIGS. 4 to 6C, the left side constant velocity joint (CVJ) 50 will now be described in detail. The right side CVJ 50 is a mirror image of the left side CVJ 50, and as such will not be described separately.

The CVJ 50 has an outer housing 102, an inner race 104, a cage 106 and a plurality of balls 108. The outer housing 102 is connected to the output bevel gear 47 of the rear gear assembly 46 and the inner race 104 is connected to the rear drive axle 52.

The outer housing 102 is cylindrical and hollow. The outer housing 102 rotates about its cylindrical axis 110, hereinafter referred to as the first rotation axis 110. The outer housing 102 has an open end 114 on the right side and a closed end 116 opposite the open end. A shaft 118, coaxial with the first rotation axis 110, extends leftwards from the closed end 116. In the illustrated embodiment, the shaft 118 is formed integrally with the closed end 116 of the outer housing 102. It is also contemplated that instead of being integrally formed with the closed end 116, a shaft 118 could be connected to the closed end 116.

The shaft 118 is coupled to the bevel gear 47 for rotating the outer housing 102 about the first rotation axis 110. The shaft 118 is coupled to the bevel gear 47 such that the first rotation axis 110 is fixed and coaxial with the rotation axis of the bevel gear 47. The shaft 118 is inserted into a central opening of the output bevel gear 47 through an opening in the housing 46 of the rear gear assembly 46. A circlip inserted into corresponding circumferential grooves 119 of the bevel gear 47 and the shaft 118 serves to prevent axial motion of the shaft 118 with respect to the bevel gear 47. Complementary splines 117 (FIG. 5), extending in the axial direction (parallel to the first rotation axis 110), on the inner surface of the bevel gear 47 and the outer surface of the shaft 118 rotationally couple the bevel gear 47 and the shaft 118. Lip seals 49 installed in the opening of the housing 46 around the first shaft 118 prevent dust and debris from entering the housing 46 and damaging the roller bearings 48 supporting the output bevel gear 47. The first rotation axis 110 is fixed and coincides with the horizontal plane 88 passing through the center of the bevel gear 47.

The inner race 104 is hollow and has a rounded shaped like a partial ellipsoid. The inner race 104 is disposed inside the outer housing 102 such that there is a space between the inner surface 120 of the outer housing 102 and the outer surface 124 of the inner race 104. The inner race 104 rotates about its central axis 112, hereinafter referred to as the second rotation axis 112. One end of the rear drive axle 52 is inserted into the hollow interior of the inner race 104 and retained therein by means of a circlip 123 installed in corresponding circumferential grooves of the inner race 104 and rear drive axle 52. The rear drive axle 52 is coaxial with the second rotation axis 112. The inner race 104 and the rear drive axle 52 are rotationally coupled by axially extending complementary splines 125 (FIG. 5) on the outer surface of the rear drive axle 52 and the inner surface of the inner race 104.

The cage 106 is also hollow, and rounded with six windows 130 defined in its walls. Two of the six cage windows 130 can be seen in section in FIG. 5. The cage 106 is disposed between the outer housing 102 and the inner race 104 so as to be spaced from the inner surface 120 of the outer housing 102 and the outer surface 124 of the inner race 104. The cage windows 130 project onto the outer surface 124 of the inner race 104. The cylindrical axis 132 of the cage 106 is aligned with the second rotation axis 112 in the configuration of the CVJ 50 illustrated in FIGS. 4 and 5. The cage 106, however, is movable with respect to the inner race 104 and the outer housing 102 so that the cylindrical axis 132 of the cage 106 can be in positions aligned or misaligned with either of the first and the second rotation axes 110, 112.

A ball 108 is placed in each of the cage windows 130 between the inner surface 120 of the outer housing 102 and the outer surface 124 of the inner race 104. The outer housing 102 has outer housing grooves 140 along its inner surface 120 corresponding to each cage window 130 and each ball 108. The outer housing grooves 140 extend parallel to the first rotation axis 110 between the closed left end 116 and the open right end 114. The inner race 104 has inner race grooves 142, corresponding to each cage window 130 and each ball 108, extending along its outer surface 124. The inner race grooves 142 extend parallel to the second rotation axis 112 between the left and right ends of the inner race 104. The surface of the inner race grooves 142 curves smoothly outwards (away from the second rotation axis 112) from towards the outer end of the inner race 104 where the surface of the grooves 142 is closer to the outer housing 102.

Each ball 108 is thus retained by a cage window 130 between the outer housing groove 140 and the corresponding inner race groove 142. The balls 108 provide the driving connection between the outer housing 102 and the inner race 104 so that rotation of the outer housing 102 about the first rotation axis 110 causes rotation of the inner race 104 about the second rotation axis 112, and vice versa. Torque applied by the bevel gear 47 of the gear assembly 46 is thus transferred sequentially through the outer housing 102, to the balls 108, to the inner race 104, to the drive axle 52 and thereafter to the rear wheel 14 in order to propel the RUV 10.

The rotational speed of the rear drive axle 52 about the second rotation axis 112 remains the same as that of the output bevel gear 47 about the first rotation axis 110 even as the rear drive axle 52 moves laterally inwards and outwards, and vertically up and down with respect to the rear gear assembly 46 when the RUV 10 is travelling on uneven ground. The balls 108 roll along the corresponding outer housing grooves 140 and the corresponding inner race grooves 142 as the inner race 104 moves in and out in the axial direction of the outer housing 102, and as the outer housing 102 and the inner race 104 continue rotation about their respective rotation axes 110, 112. In the illustrated configuration of the CVJ 50, the balls 108 roll along the longitudinal outer housing grooves 140 between the center and the outer edge near the open end 114. The balls 108 traverse more or less of the corresponding outer housing grooves 140 and inner race grooves 142 depending on the relative angular orientation of rotation axes 110, 112 and the relative axial positions of the outer housing 102 and inner race 104. As mentioned above, friction between the ball 108 and the surfaces of the corresponding grooves 140, 142 generates heat which must be dissipated. The amount of heat generated increases with rotation speeds and with the angle between the rotation axes 110, 112.

A flexible boot 146 is attached at one end to the outer housing 102 and at the opposite end to the rear drive axle 52 using clamps 148. The flexible boot 146 has accordion like walls, and is made of rubber, but it is contemplated that it can be made of any suitable material. The boot 146 prevents dust and debris from entering the CVJ 50.

A cooling member 150, in the form of a cylindrical sleeve 150, is positioned over the cylindrical outer surface 122 of the outer housing 102. The cooling sleeve 150 is made of aluminum and is press fit around the outer housing 102. The aluminum sleeve 150 conducts heat much better than the steel outer housing 102. The sleeve 150 absorbs heat from the outer housing 102, and conducts the absorbed heat away to the air flowing over the sleeve 150 as the CVJ 50 rotates.

The cooling sleeve 150 is provided with a number of fins 152 protruding outwards away from the outer housing 102 to more efficiently conduct heat away from the outer housing 102. As best seen in FIGS. 3A, 3B, 6A and 6B, the fins 152 extend in a circumferential direction with respect to the outer housing 102, and thus perpendicular to the first rotation axis 110. Although the circumferential fins 152 conduct heat away from the outer housing 102 more efficiently, it is also contemplated that the fins 152 could extend along the axial direction of the outer housing 102, parallel to the first rotation axis 110, as in the embodiment illustrated in FIG. 6C.

The cooling sleeve 150 is symmetric about the first rotation axis 110, and its length 102 (along the direction of the first rotation axis 110) is smaller than the length of the outer housing 102. Thus, a portion of the outer surface 122 of the outer housing 102 extends outside the cooling sleeve 150 on both ends. One portion of the outer housing 102 that extends outside the cooling sleeve 150 extends into the gear assembly 46. Another portion of the outer housing 102 that extends outside the cooling sleeve 150 has the flexible boot 146 attached thereon.

The cooling sleeve 150 extends over the outer housing along the entire sliding distance of the balls 108, i.e. along the outer surface 122 corresponding to entire length of the outer housing grooves 140 formed in the inner surface 120. It is however contemplated that the cooling sleeve 150 could cover more or less of the outer surface 122 than the portion corresponding to the grooves 140.

A dust lip 154 (best seen in FIG. 6A) is provided at the end of the cylindrical cooling sleeve 150 proximate the gear assembly 46. The dust lip 154 overlaps a portion of an annular flange 156 extending from the gear assembly 46 towards the CVJ 50. The outer housing 120 extends into the annular flange 156 for connection with the gear assembly 46. The annular flange 156 is thus received between the dust lip 154 and the portion of the outer surface 122 of the outer housing 120 that extends into the gear assembly 46. The dust lip 154 helps to seal the connection between the gear assembly 46 and the CVJ 50, to prevent debris/dust from entering the gear assembly 46. It is contemplated that the dust lip 154 could be omitted as in the embodiments of the cooling sleeves 150 illustrated in FIGS. 6B and 6C.

It is contemplated that the boot 146 could be clamped to the outer housing 102 over the cooling sleeve 150 at the end opposite to the dust lip 154.

It is contemplated that the cooling member 150 could be constructed in the form of a plurality of cooling rings press fit on the outer housing 102 instead of a continuous cooling sleeve 150 extending across the length of the outer housing 102. It is further contemplated that the cooling member 150 could be a cooling sleeve having grooves extending through the sleeve wall to expose the outer housing 102 inside. It is contemplated that the cooling sleeve 150 could have fins 152 extending in both directions, parallel and perpendicular to the first rotation axis 110, or neither parallel nor perpendicular to the first rotation axis 110. The fins 152 could, for instance, curve elliptically around the cylindrical sleeve 150.

The CVJ 70 connecting the front gear assembly 66 to the front drive axle 72, which is also a plunging ball-type CVJ, does not have the cooling sleeve 150 installed thereon. It is also contemplated that a cooling member 150 could be installed on the CVJ 70. It is further contemplated that a cooling member 150 could also be installed on the fixed ball-type CVJs 56, 76 connecting the rear and front drive axles 52, 72 respective to the rear and front wheels 14.

The CVJ 50 described herein is a plunging ball-type CVJ which allows movement of the outer housing 102 and the inner race 104 in the axial direction (direction parallel to the first rotation axis 110). It is contemplated that aspects of the present invention could also be applied to fixed ball-type CVJs which do not allow axial movement of the outer housing 102 and the inner race 104. Aspects of the present invention could also be applied to other types of universal joints such as tripod type CVJs and cross groove CVJs.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A constant velocity joint for transmitting rotation between a first shaft and a second shaft, comprising:
   an outer housing rotatable about a first rotation axis, the outer housing being adapted to be connected to the first shaft, the first rotation axis being coaxial with the first shaft, the outer housing having an inner surface and an outer surface;
   an inner race rotatable about a second rotation axis, the inner race being disposed inside the outer housing and spaced therefrom, the inner race being adapted to be connected to the second shaft, the second rotation axis being coaxial with the second shaft;
   the outer housing and inner race being movable relative to one another to change an angle between the first axis and the second axis of rotation;
   a cage disposed between the outer housing and the inner race;
   a plurality of balls held between the outer housing and the inner race so that rotation of one of the outer housing about the first rotation axis and the inner race about the second rotation axis causes rotation of the other of the outer housing about the first rotation axis of rotation and the inner race about the second rotation axis,
       each of the plurality of balls being retained in a corresponding cage window defined through the cage so as to roll along a corresponding one of a plurality of outer housing grooves and a corresponding one of a plurality of inner housing grooves,
           each outer housing groove being defined on the inner surface of the outer housing,
           each inner race groove being defined on an outer surface of the inner race;
   a cooling member fitted onto the outer housing, at least a portion of the outer surface of the outer housing being in contact with the cooling member; and
   a flexible boot having:
       a first end portion of the flexible boot being removably attached to the outer housing at a portion of the outer surface extending outside the cooling member, and
       a second end portion of the flexible boot, opposite to the first end portion, being adapted to be removably attached to the second shaft.

2. The joint of claim 1, wherein the outer housing and inner race are moveable relative to one another along a direction parallel to the first rotation axis.

3. The joint of claim 1, wherein the outer housing is in contact with the cooling member on the outer surface in a region where the corresponding inner surface has the plurality of outer housing grooves defined thereon.

4. The joint of claim 1, wherein the cooling member is symmetric about the first rotation axis.

5. The joint of claim 1, wherein at least a portion of the outer surface of the outer housing is cylindrical and the cooling member is a cooling sleeve enclosing the portion of the outer housing.

6. The joint of claim 1, wherein the cooling member comprises fins extending outward away from the outer surface of the outer housing.

7. The joint of claim 6, wherein the fins extend in a direction transverse to the first rotation axis.

8. The joint of claim 6, wherein the fins extend in a direction parallel to the first rotation axis.

9. The joint of claim 1, wherein
   the cooling member comprises a dust lip at an end of the cooling member, the dust lip being spaced from the outer surface of the outer housing to receive a flange therebetween.

10. The joint of claim 1, wherein the cooling member is press fit on the outer surface of the outer housing.

11. The joint of claim 1, wherein at least a portion of the outer surface of the outer housing is cylindrical and the cooling member comprises at least one cooling ring enclosing the cylindrical portion of the outer housing.

12. The joint of claim 1, wherein the cooling member comprises at least one of:
   at least one fin extending outward away from the outer surface of the outer housing; and
   at least one groove exposing the outer surface of the outer housing.

13. A powertrain comprising:
   a motor;
   a driveshaft connected to the motor and being rotatable thereby;
   a gear assembly connected to the driveshaft, the gear assembly having at least one output gear;
   a left drive axle and a right drive axle, each drive axle being adapted to be connected to a wheel; and
   a left constant velocity joint and a right constant velocity joint each of the left and right constant velocity joints transmitting rotation between a corresponding first shaft and a corresponding second shaft, each of the left and right constant velocity joints comprising:
       an outer housing rotatable about a first rotation axis, the outer housing being adapted to be connected to the corresponding first shaft, the first rotation axis being coaxial with the first shaft, the outer housing having an inner surface and an outer surface;
       an inner race rotatable about a second rotation axis, the inner race being disposed inside the outer housing and spaced therefrom, the inner race being adapted to be connected to the corresponding second shaft, the second rotation axis being coaxial with the second shaft;
       the outer housing and inner race being movable relative to one another to change an angle between the first axis and the second axis of rotation;
       a cage disposed between the outer housing and the inner race;
       a plurality of balls held between the outer housing and the inner race so that rotation of one of the outer housing about the first rotation axis and the inner race about the second rotation axis causes rotation of the other of the outer housing about the first rotation axis of rotation and the inner race about the second rotation axis,
           each of the plurality of balls being retained in a corresponding cage window defined through the cage so as to roll along a corresponding one of a plurality of outer housing grooves and a corresponding one of a plurality of inner housing grooves,
each outer housing groove being defined on the inner surface of the outer housing,
each inner race groove being defined on an outer surface of the inner race, and
a cooling member fitted onto the outer housing, at least a portion of the outer surface of the outer housing being in contact with the cooling member;
wherein, for each of the left and right constant velocity joints:
the first shaft is connected to the outer housing;
the second shaft is connected to the inner race;
the first shaft is connected to the at least one output gear, and
the second shaft is connected to the corresponding one of the left and right drive axles; and
wherein the gear assembly has a left flange and a right flange,
the left flange extending towards the left constant velocity joint, and
the right flange extending towards the right constant velocity joint.

14. The powertrain of claim 13, wherein each of the left constant velocity joint and a right constant velocity joint has a portion of the outer surface of the outer housing extending outside the cooling member and extending into the gear assembly.

15. The powertrain of claim 13, wherein for each of the left constant velocity joint and the right constant velocity joint:
the corresponding one of the left and right flanges further extends over a portion of the outer surface of the outer housing extending outside the cooling member.

16. The powertrain of claim 13, wherein for each of the left constant velocity joint and the right constant velocity joint:
the cooling member comprises a dust lip at an end thereof;
the corresponding one of the left and right flanges is received between the outer surface of the outer housing and the dust lip.

17. The powertrain of claim 13, wherein for each of the left constant velocity joint and a right constant velocity joint:
the first shaft is integrally connected to the outer housing.

18. The powertrain of claim 13, wherein for each of the left constant velocity joint and a right constant velocity joint:
the second shaft is integrally connected to the corresponding one of the left and right drive axles.

19. A vehicle comprising:
a frame;
a cockpit area defined in the frame;
at least one seat disposed in the cockpit area;
a motor connected to the frame;
a pair of front wheels connected to the frame, the pair of front wheels including a left front wheel and a right front wheel;
a pair of rear wheels connected to the frame, the pair of rear wheels including a left rear wheel and a right rear wheel connected to the frame;
at least one of the pair of front wheels and the pair of rear wheels being operatively connected to the engine for propelling the vehicle;
a steering member operatively connected to at least one of the pair of front wheels and the pair of rear wheels;
a driveshaft connected to the motor, the driveshaft being rotatable thereby;
a gear assembly connected to the driveshaft, the gear assembly having at least one output gear;
a left drive axle and a right drive axle, the left drive axle being connected to the left one of one of the pair of front wheels and the pair of rear wheels, the right drive axle being connected to the right one of the one of the pair of front wheels and the pair of rear wheels; and
a left constant velocity joint and a right constant velocity joint, each of the left and right constant velocity joints transmitting rotation between a corresponding first shaft and a corresponding second shaft, each of the left and right constant velocity joints comprising:
an outer housing rotatable about a first rotation axis, the outer housing being adapted to be connected to the corresponding first shaft, the first rotation axis being coaxial with the first shaft, the outer housing having an inner surface and an outer surface;
an inner race rotatable about a second rotation axis, the inner race being disposed inside the outer housing and spaced therefrom, the inner race being adapted to be connected to the corresponding second shaft, the second rotation axis being coaxial with the second shaft;
the outer housing and inner race being movable relative to one another to change an angle between the first axis and the second axis of rotation;
a cage disposed between the outer housing and the inner race;
a plurality of balls held between the outer housing and the inner race so that rotation of one of the outer housing about the first rotation axis and the inner race about the second rotation axis causes rotation of the other of the outer housing about the first rotation axis of rotation and the inner race about the second rotation axis,
each of the plurality of balls being retained in a corresponding cage window defined through the cage so as to roll along a corresponding one of a plurality of outer housing grooves and a corresponding one of a plurality of inner housing grooves,
each outer housing groove being defined on the inner surface of the outer housing,
each inner race groove being defined on an outer surface of the inner race, and
a cooling member fitted onto the outer housing, at least a portion of the outer surface of the outer housing being in contact with the cooling member;
wherein, for each of the left and right constant velocity joints:
the first shaft is connected to the outer housing;
the second shaft is connected to the inner race;
the first shaft is connected to the at least one output gear, and
the second shaft is connected to the corresponding one of the left and right drive axles; and
wherein when the vehicle is stationary on level ground, a position of the center of the left rear wheel and a position of the center of the right rear wheel are each one of:
vertically lower than, and
vertically aligned with,
the respective one of the left and right constant velocity joints.

20. A vehicle comprising:
a frame;
a cockpit area defined in the frame;
at least one seat disposed in the cockpit area;
a motor connected to the frame;
a pair of front wheels connected to the frame, the pair of front wheels including a left front wheel and a right front wheel;

a pair of rear wheels connected to the frame, the pair of rear wheels including a left rear wheel and a right rear wheel connected to the frame;
at least one of the pair of front wheels and the pair of rear wheels being operatively connected to the engine for propelling the vehicle;
a steering member operatively connected to at least one of the pair of front wheels and the pair of rear wheels;
a driveshaft connected to the motor, the driveshaft being rotatable thereby;
a gear assembly connected to the driveshaft, the gear assembly having at least one output gear;
a left drive axle and a right drive axle, the left drive axle being connected to the left one of one of the pair of front wheels and the pair of rear wheels, the right drive axle being connected to the right one of the one of the pair of front wheels and the pair of rear wheels; and
a left constant velocity joint and a right constant velocity joint, each of the left and right constant velocity joints transmitting rotation between a corresponding first shaft and a corresponding second shaft, each of the left and right constant velocity joints comprising:
  an outer housing rotatable about a first rotation axis, the outer housing being connected to the corresponding first shaft, the first rotation axis being coaxial with the first shaft, the outer housing having an inner surface and an outer surface;
  an inner race rotatable about a second rotation axis, the inner race being disposed inside the outer housing and spaced therefrom, the inner race being connected to the corresponding second shaft, the second rotation axis being coaxial with the second shaft;
  the outer housing and inner race being movable relative to one another to change an angle between the first axis and the second axis of rotation;
  a cage disposed between the outer housing and the inner race;
  a plurality of balls held between the outer housing and the inner race so that rotation of one of the outer housing about the first rotation axis and the inner race about the second rotation axis causes rotation of the other of the outer housing about the first rotation axis of rotation and the inner race about the second rotation axis,
    each of the plurality of balls being retained in a corresponding cage window defined through the cage so as to roll along a corresponding one of a plurality of outer housing grooves and a corresponding one of a plurality of inner housing grooves,
      each outer housing groove being defined on the inner surface of the outer housing,
      each inner race groove being defined on an outer surface of the inner race, and
  a cooling member fitted onto the outer housing, at least a portion of the outer surface of the outer housing being in contact with the cooling member;
wherein, for each of the left and right constant velocity joints:
  the first shaft is connected to the at least one output gear, and
  the second shaft is connected to the corresponding one of the left and right drive axles; and
wherein when the vehicle is stationary on level ground, a position of the center of the left rear wheel and a position of the center of the right rear wheel are each one of:
longitudinally rearward of, and
longitudinally aligned with,
the respective one of the left and right constant velocity joints.

21. A constant velocity joint for transmitting rotation between a first shaft and a second shaft, comprising:
  an outer housing rotatable about a first rotation axis, the outer housing being adapted to be connected to the first shaft, the first rotation axis being coaxial with the first shaft, the outer housing having an inner surface and an outer surface;
  an inner race rotatable about a second rotation axis, the inner race being disposed inside the outer housing and spaced therefrom, the inner race being adapted to be connected to the second shaft, the second rotation axis being coaxial with the second shaft;
  the outer housing and inner race being movable relative to one another to change an angle between the first axis and the second axis of rotation;
  a cage disposed between the outer housing and the inner race;
  a plurality of balls held between the outer housing and the inner race so that rotation of one of the outer housing about the first rotation axis and the inner race about the second rotation axis causes rotation of the other of the outer housing about the first rotation axis of rotation and the inner race about the second rotation axis,
    each of the plurality of balls being retained in a corresponding cage window defined through the cage so as to roll along a corresponding one of a plurality of outer housing grooves and a corresponding one of a plurality of inner housing grooves,
      each outer housing groove being defined on the inner surface of the outer housing,
      each inner race groove being defined on an outer surface of the inner race; and
  a cooling member fitted onto the outer housing, at least a portion of the outer surface of the outer housing being in contact with the cooling member, the cooling member comprising fins extending outward away from the outer surface of the outer housing, the fins extending in a direction transverse to the first rotation axis.

22. A constant velocity joint for transmitting rotation between a first shaft and a second shaft, comprising:
  an outer housing rotatable about a first rotation axis, the outer housing being adapted to be connected to the first shaft, the first rotation axis being coaxial with the first shaft, the outer housing having an inner surface and an outer surface;
  an inner race rotatable about a second rotation axis, the inner race being disposed inside the outer housing and spaced therefrom, the inner race being adapted to be connected to the second shaft, the second rotation axis being coaxial with the second shaft;
  the outer housing and inner race being movable relative to one another to change an angle between the first axis and the second axis of rotation;
  a cage disposed between the outer housing and the inner race;
  a plurality of balls held between the outer housing and the inner race so that rotation of one of the outer housing about the first rotation axis and the inner race about the second rotation axis causes rotation of the other of the outer housing about the first rotation axis of rotation and the inner race about the second rotation axis,
    each of the plurality of balls being retained in a corresponding cage window defined through the cage so as to roll along a corresponding one of a plurality of outer housing grooves and a corresponding one of a plurality of inner housing grooves, each outer housing groove being defined on the inner surface of the outer housing, each inner race groove being defined on an outer surface of the inner race, and a cooling member fitted onto the outer housing, at least a portion of the outer surface of the outer housing being in contact with the cooling member, the cooling member comprising a dust lip at an end of the cooling member, the dust lip being spaced from the outer surface of the outer housing to receive a flange therebetween.

23. A constant velocity joint for transmitting rotation between a first shaft and a second shaft, comprising:

an outer housing rotatable about a first rotation axis, the outer housing being adapted to be connected to the first shaft, the first rotation axis being coaxial with the first shaft, the outer housing having an inner surface and an outer surface;

an inner race rotatable about a second rotation axis, the inner race being disposed inside the outer housing and spaced therefrom, the inner race being adapted to be connected to the second shaft, the second rotation axis being coaxial with the second shaft;

the outer housing and inner race being movable relative to one another to change an angle between the first axis and the second axis of rotation;

a cage disposed between the outer housing and the inner race;

a plurality of balls held between the outer housing and the inner race so that rotation of one of the outer housing about the first rotation axis and the inner race about the second rotation axis causes rotation of the other of the outer housing about the first rotation axis of rotation and the inner race about the second rotation axis, each of the plurality of balls being retained in a corresponding cage window defined through the cage so as to roll along a corresponding one of a plurality of outer housing grooves and a corresponding one of a plurality of inner housing grooves, each outer housing groove being defined on the inner surface of the outer housing, each inner race groove being defined on an outer surface of the inner race, and a cooling member fitted onto the outer housing, at least a portion of the outer surface of the outer housing being in contact with the cooling member, the cooling member being press fit on the outer surface of the outer housing.

24. A constant velocity joint for transmitting rotation between a first shaft and a second shaft, comprising:

an outer housing rotatable about a first rotation axis, the outer housing being adapted to be connected to the first shaft, the first rotation axis being coaxial with the first shaft, the outer housing having an inner surface and an outer surface, at least a portion of the outer surface of the outer housing being cylindrical;

an inner race rotatable about a second rotation axis, the inner race being disposed inside the outer housing and spaced therefrom, the inner race being adapted to be connected to the second shaft, the second rotation axis being coaxial with the second shaft;

the outer housing and inner race being movable relative to one another to change an angle between the first axis and the second axis of rotation;

a cage disposed between the outer housing and the inner race;

a plurality of balls held between the outer housing and the inner race so that rotation of one of the outer housing about the first rotation axis and the inner race about the second rotation axis causes rotation of the other of the outer housing about the first rotation axis of rotation and the inner race about the second rotation axis, each of the plurality of balls being retained in a corresponding cage window defined through the cage so as to roll along a corresponding one of a plurality of outer housing grooves and a corresponding one of a plurality of inner housing grooves, each outer housing groove being defined on the inner surface of the outer housing, each inner race groove being defined on an outer surface of the inner race, and a cooling member fitted onto the outer housing, at least a portion of the outer surface of the outer housing being in contact with the cooling member, the cooling member comprising at least one cooling ring enclosing the cylindrical portion of the outer housing.

* * * * *